United States Patent
Nagao

(10) Patent No.: US 12,142,262 B2
(45) Date of Patent: Nov. 12, 2024

(54) SEGMENT DETECTING DEVICE, SEGMENT DETECTING METHOD, AND MODEL GENERATING METHOD

(71) Applicant: PREFERRED NETWORKS, INC., Tokyo (JP)

(72) Inventor: Manabu Nagao, Tokyo (JP)

(73) Assignee: Preferred Networks, Inc., Tokyo (JP)

(*) Notice: Subject to any disclaimer, the term of this patent is extended or adjusted under 35 U.S.C. 154(b) by 296 days.

(21) Appl. No.: 17/503,111

(22) Filed: Oct. 15, 2021

(65) Prior Publication Data

US 2022/0036885 A1    Feb. 3, 2022

Related U.S. Application Data

(63) Continuation of application No. PCT/JP2020/017871, filed on Apr. 25, 2020.

(30) Foreign Application Priority Data

Apr. 26, 2019 (JP) .................. 2019-086789

(51) Int. Cl.
*G10L 15/16* (2006.01)
*G10L 15/04* (2013.01)
*G10L 21/0224* (2013.01)

(52) U.S. Cl.
CPC .............. *G10L 15/16* (2013.01); *G10L 15/04* (2013.01); *G10L 21/0224* (2013.01)

(58) Field of Classification Search
CPC ...... G10L 15/16; G10L 15/04; G10L 21/0224
USPC .......................................... 704/232; 703/232
See application file for complete search history.

(56) References Cited

U.S. PATENT DOCUMENTS

| 6,338,036 B1 | 1/2002 | Miyazawa |
| 6,393,396 B1 | 5/2002 | Nakagawa et al. |
| 2005/0091050 A1* | 4/2005 | Surendran ............... G10L 25/78 704/226 |

(Continued)

FOREIGN PATENT DOCUMENTS

| JP | S60-254100 A | 12/1985 |
| JP | H02-090199 A | 3/1990 |

(Continued)

OTHER PUBLICATIONS

D. Rane, P. Shirodkar, T. Panigrahi and S. Mini, "Detection of Ambulance Siren in Traffic," 2019 International Conference on Wireless Communications Signal Processing and Networking (WiSPNET), Chennai, India, 2019, pp. 401-405, doi: 10.1109/WiSPNET45539.2019.9032797. keywords: {Neural networks;Featur (Year: 2019).*

(Continued)

*Primary Examiner* — Bharatkumar S Shah

(74) *Attorney, Agent, or Firm* — Foley & Lardner LLP

(57) ABSTRACT

A segment detecting device according to an embodiment includes at least one memory; and at least one processor. The at least one processor receives at least one of (i) an input signal including a first signal and a second signal or (ii) feature data representing one or a plurality of features of the input signal, estimates a level of the second signal by inputting the input signal or the feature data into a neural network, and determines a segment including the second signal in the input signal based on the level of the second signal.

22 Claims, 12 Drawing Sheets

(56) References Cited

U.S. PATENT DOCUMENTS

| | | | |
|---|---|---|---|
| 2011/0191101 A1* | 8/2011 | Uhle | G10L 21/0208 |
| | | | 704/205 |
| 2013/0073283 A1* | 3/2013 | Yamabe | G10L 21/0216 |
| | | | 704/226 |
| 2013/0262116 A1* | 10/2013 | Ben-Ezra | G10L 15/04 |
| | | | 704/E15.005 |
| 2019/0088272 A1 | 3/2019 | Shioda et al. | |

FOREIGN PATENT DOCUMENTS

| | | |
|---|---|---|
| JP | 08-185196 A | 7/1996 |
| JP | H10-254476 A | 9/1998 |
| JP | 2000-047696 A | 2/2000 |
| JP | 2000-081891 A | 3/2000 |
| JP | 2001-166783 A | 6/2001 |
| JP | 2002-073061 A | 3/2002 |
| JP | 2006-091912 | 4/2006 |
| JP | 2016-143042 A | 8/2016 |
| JP | 2019-053233 A | 4/2019 |
| WO | WO-2019/026973 | 2/2019 |

OTHER PUBLICATIONS

Abhishek Sehgal et al., "A Convolutional Neural Network Smartphone App for Real-Time Voice Activity Detection", IEEE Access, vol. 6, pp. 9017-9026 (Feb. 1, 2018).

Alex Graves, "Supervised Sequence Labelling with Recurrent Neural Networks" Available online, URL: https://www.cs.toronto.edu/~graves/phd.pdf (2012).

Jurgen Tchorz et al., "Estimation of the signal-to-noise ratio with amplitude modulation spectrograms," Speech Communication, Sep. 2002, vol. 38, Issues 1-2, pp. 1-17 (2002).

William Chan, "Listen, Attend and Spell", arXiv:1508.01211v2 [cs.CL], (Aug. 20, 2015) Available online, URL: https://arxiv.org/pdf/1508.01211.pdf.

Zulfiqar Ali and Muhammad Talha, "Innovative Method for Unsupervised Voice Activity Detection and Classification of Audio Segments", IEEE Access, vol. 6, pp. 15494-15504 (Feb. 13, 2018).

Ohtani et al., "Music Source Enhancement Using a Convolutional Denoising Autoencoder and Log-frequency Scale Spectral Features", The transactions of the Institute of Electronics, Information and Communication Engineers. D, 2018.3, vol. J101, No. 3, pp. 615-627.

Yamamoto et al., "Robust Endpoint Detection for Speech Recognition based on Discriminative Feature Extraction", Multimedia Laboratory, Corporate R&D Center, Toshiba Corporation, Speech Technology Group, Cambridge Research Laboratory, Toshiba Research Europe Ltd., ICASSP 2006, pp. 805-808.

Francois Chollet et al., "Deep Learning with R," first edition, Oona Japan, Oct. 2018, pp. 103-104.

Hiroaki Itou et al., "Music suppression method for single channel speech mixed with BGM using Bayesian networks," IEICE Technical Report, Dec. 2008, 108th Volume, No. 338, pp. 19-24.

Final Office Action in Japanese Patent Application No. 2021-516318 dated Jul. 23, 2024.

* cited by examiner

SEGMENT DETECTING DEVICE, SEGMENT DETECTING METHOD, AND MODEL GENERATING METHOD

CROSS-REFERENCE TO RELATED APPLICATIONS

This application is based upon and claims the benefit of priority from Japanese Patent Application No. 2019-086789, filed on Apr. 26, 2019, and International Patent Application No. PCT/JP2020/017871 filed on Apr. 25, 2020; the entire contents of all of which are incorporated herein by reference.

BACKGROUND OF THE INVENTION

1. Field of the Invention

Embodiments of the present invention relate to a segment detecting device, segment detecting method, and a model generating method.

2. Description of the Related Art

There is known a method of using sound volume of an input signal for determining a voice segment and a non-voice segment in the input signal. However, due to influence of noise, the sound volume obtained under a noise environment has a value different from sound volume that is obtained when there is no noise. Thus, the voice segment cannot be correctly determined under the noise environment in some cases.

SUMMARY OF THE INVENTION

An object of the present invention is to determine a segment with high accuracy.

A segment detecting device according to an embodiment includes at least one memory; and at least one processor. The at least one processor receives at least one of (i) an input signal including a first signal and a second signal or (ii) feature data representing one or a plurality of features of the input signal, estimates a level of the second signal by inputting the input signal or the feature data into a neural network, and determines a segment including the second signal in the input signal based on the level of the second signal.

DETAILED DESCRIPTION OF THE PREFERRED EMBODIMENTS

The following describes embodiments in detail with reference to the drawings.

First Embodiment

Figure 1:
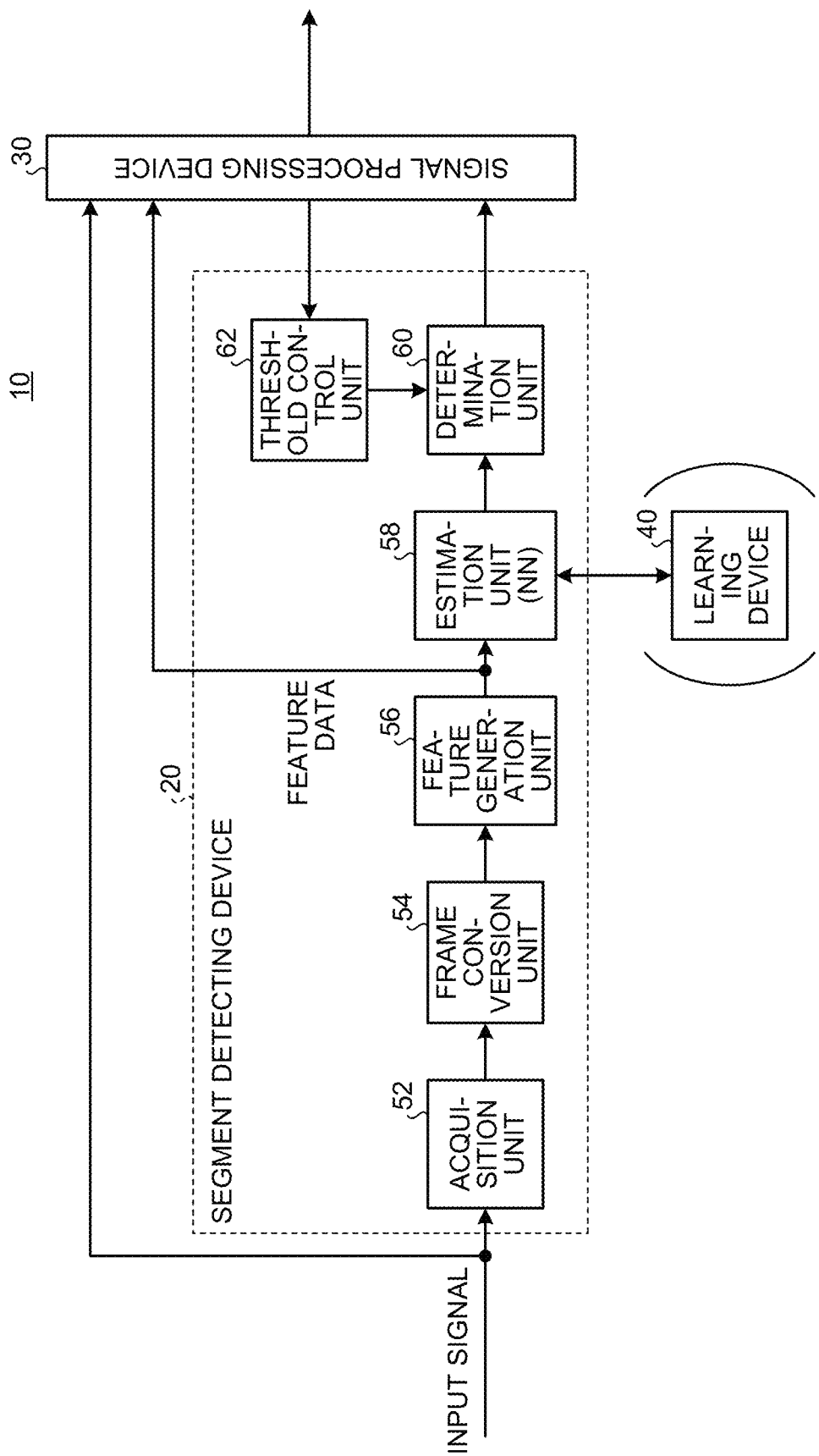
FIG. 1 is a diagram illustrating a configuration of a signal processing system according to an embodiment.

FIG. 1 is a diagram illustrating a configuration of a signal processing system 10 according to a first embodiment. The signal processing system 10 according to the present embodiment determines a segment including a target signal in an input signal using a neural network. Furthermore, the signal processing system 10 performs processing such as voice recognition processing on the segment that is determined to include the target signal in the input signal. The signal processing system 10 also trains the neural network before performing signal processing. The signal processing system 10 according to the present embodiment can determine the segment including the target signal with high accuracy by training with a light load.

The signal processing system 10 includes a segment detecting device 20, a signal processing device 30, and a learning device 40. The signal processing system 10 may include the learning device 40 at the time of training. That is, the signal processing system 10 does not necessarily include the learning device 40 at the time of signal processing.

The segment detecting device 20 includes an acquisition unit 52, a frame conversion unit 54, a feature generation unit 56, an estimation unit 58, a determination unit 60, and a threshold control unit 62.

The acquisition unit 52 acquires an input signal. The input signal is constituted of a target signal and a noise signal (non-target signal), and the target signal and the noise signal may be mixed together in some segments. In the present embodiment, the noise signal is an example of a "first signal", and the target signal is an example of a "second signal". In the present embodiment, the target signal is a voice signal representing human voice. In the present embodiment, the noise signal is a signal representing sound other than the human voice. In a case in which two or more people speak at the same time, the target signal may be assumed to be a voice signal representing voice of one person as a target, and a voice signal representing voice of a person other than the target may be assumed to be the noise signal. A combination of the target signal and the non-target signal included in the input signal may be a combination other than the combination of the voice signal and the noise signal.

In the present embodiment, the input signal is time series data obtained by sampling and digitizing a signal representing sound collected by a microphone under an environment in which noise is generated, for example. The acquisition unit 52 acquires such an input signal from a sound collecting device including a microphone, A/D conversion device, and the like. Alternatively, the acquisition unit 52 may acquire the input signal from another device via a network.

The frame conversion unit 54 converts the input signal into a sequence of frames having a predetermined time width. More specifically, the frame conversion unit 54 successively extracts a frame from the input signal for each predetermined time, and outputs a sequence of temporally continuous frames. Each frame included in the sequence of the frames is a segment for calculating a feature vector. The frame conversion unit 54 extracts the frames so that center times are shifted from each other at predetermined intervals. For example, the frame conversion unit 54 extracts the frames so that the center times are shifted from each other at intervals of 10 milliseconds. Each frame has a predetermined time length. Each frame may partially overlap another frame temporally adjacent thereto. For example, each frame has a time length of 25 milliseconds.

The feature generation unit 56 generates feature data representing one or a plurality of features of the input signal by analyzing the feature of the input signal in units of the frame. For example, the feature generation unit 56 generates a feature vector representing a plurality of features in units of the frame. The feature generation unit 56 then successively outputs the feature vector to generate the feature data.

The feature vector includes a plurality of pieces of data representing a plurality of features of the input signal. For example, the feature vector includes waveform data itself of the input signal, frequency data obtained by performing short-time Fourier transformation on the waveform data, or data obtained by performing a predetermined arithmetic operation on the frequency data. For example, the feature vector includes a Mel filter bank output or a Mel Frequency Cepstral Coefficient (MFCC). The feature vector may also include at least one of the waveform data of the input signal or the frequency data of the input signal.

The estimation unit 58 includes a neural network (NN) that receives an input of the feature data, and outputs an estimation value of a level of the target signal. The estimation unit 58 receives vector data from the feature generation unit 56, and estimates the level of the target signal (the voice signal in the present embodiment) by inputting the received vector data to the neural network. For example, the estimation unit 58 estimates the level in units of the frame.

In a case in which the target signal is the voice signal, the level of the target signal may represent sound volume (size) of the target signal (voice signal) included in the input signal. The level of the target signal may also be power of the target signal included in the frame of the input signal. The level of the target signal may be energy of the target signal included in the frame of the input signal so long as all frames have the same time width.

The estimation unit 58 may estimate the level in a target frame based on a frame other than the target frame as an estimation target of the level. For example, the estimation unit 58 may estimate the level in the target frame based on a plurality of continuous frames including the target frame as the estimation target of the level. For example, the estimation unit 58 may estimate the level in the target frame based on the target frame as the estimation target of the level, a predetermined number of frames temporally before the target frame, and a predetermined number of frames temporally after the target frame. The estimation unit 58 may also estimate the level in the target frame using any of the target frame as the estimation target of the level, a predetermined number of frames temporally before the target frame, and a predetermined number of frames temporally after the target frame.

The estimation unit 58 may directly receive the input signal in place of the feature data generated by the feature generation unit 56, and gives the received input signal to the neural network. In this case, the neural network also performs processing corresponding to the feature generation unit 56 therein. The estimation unit 58 may also receive the input signal together with the feature data generated by the feature generation unit 56, and give both of the received input signal and feature data to the neural network.

A threshold is set to the determination unit 60 in advance. The determination unit 60 acquires the level of the target signal that is estimated for each frame from the estimation unit 58.

The determination unit 60 then determines a segment (valid segment) including the target signal in the input signal by comparing the set threshold with the estimated level of the target signal. For example, the determination unit 60 determines whether each of the frames is the valid segment or an invalid segment not including the target signal in the input signal. For example, the determination unit 60 determines the frame in which the estimated level is larger than the threshold to be the valid segment. For example, the determination unit 60 determines the frame in which the estimated level is equal to or smaller than the threshold to be the invalid segment.

In a case in which each of the frames temporally overlaps another adjacent frame, for example, the determination unit 60 determines whether a predetermined time range around the center time of each of the frames is the valid segment or the invalid segment. For example, the center times of the frames are shifted from each other at intervals of 10 milliseconds, the determination unit 60 determines, for each of the frames, whether a range of 10 milliseconds from the center time of the frame is the valid segment or the invalid segment.

The determination unit 60 may smooth a determination result about the threshold and the level in a time direction to be output. Due to this, the determination unit 60 can cause a silent (noise) segment, which is recognized as part of human voice, to be a voice segment. The determination unit 60 synchronizes determination data representing the determination result with the input signal to be output to the signal processing device 30.

For example, the threshold control unit 62 receives a change command for the threshold from the signal processing device 30. The threshold control unit 62 changes the threshold to be set to the determination unit 60 in accordance with the received change command. The threshold control unit 62 may dynamically change the threshold depending on the estimated level or a characteristic of the input signal.

The signal processing device 30 receives the input signal and the determination data. The signal processing device 30 then performs signal processing on a portion of the input signal that is determined to be the valid segment based on the determination data.

In a case in which the input signal is a signal representing sound collected by a microphone, the target signal is a voice signal representing human voice, and the level represents sound volume, the signal processing device 30 performs voice recognition processing on a portion that is determined to be the valid segment based on the determination data in the input signal. The signal processing device 30 then outputs text data representing a recognition result.

The signal processing device 30 may also perform other signal processing in place of the voice recognition processing. For example, the signal processing device 30 may perform processing of causing a storage device and the like to store the portion that is determined to be the valid segment based on the determination data in the input signal.

The signal processing device 30 may give a change command for changing the threshold to the threshold control unit 62 in accordance with a result of the signal processing. For example, in a case of performing the voice recognition processing, the signal processing device 30 changes the threshold to reduce errors in a voice recognition result.

The signal processing device 30 may also receive the feature data generated by the feature generation unit 56 in place of the input signal. The signal processing device 30 may perform signal processing (for example, the voice recognition processing) on a portion that is determined to be the valid segment based on the determination data in the feature data. The signal processing device 30 may also receive both of the input signal and the feature data, and perform the signal processing on both of the input signal and the feature data.

The learning device 40 performs a model generating method for generating the neural network as a pre-learned model included in the estimation unit 58. That is, the learning device 40 appropriately trains the neural network included in the estimation unit 58 before processing performed by the segment detecting device 20 and the signal processing device 30. As a result of the training, in the neural network included in the estimation unit 58, each of a plurality of parameters (for example, a weight (coefficient) and a bias) set therein is adjusted to be an appropriate value. Due to this, the neural network can estimate the level of the target signal with high accuracy. Details about the learning device 40 will be further described with reference to FIG. 5 and FIG. 6.

Figure 2:
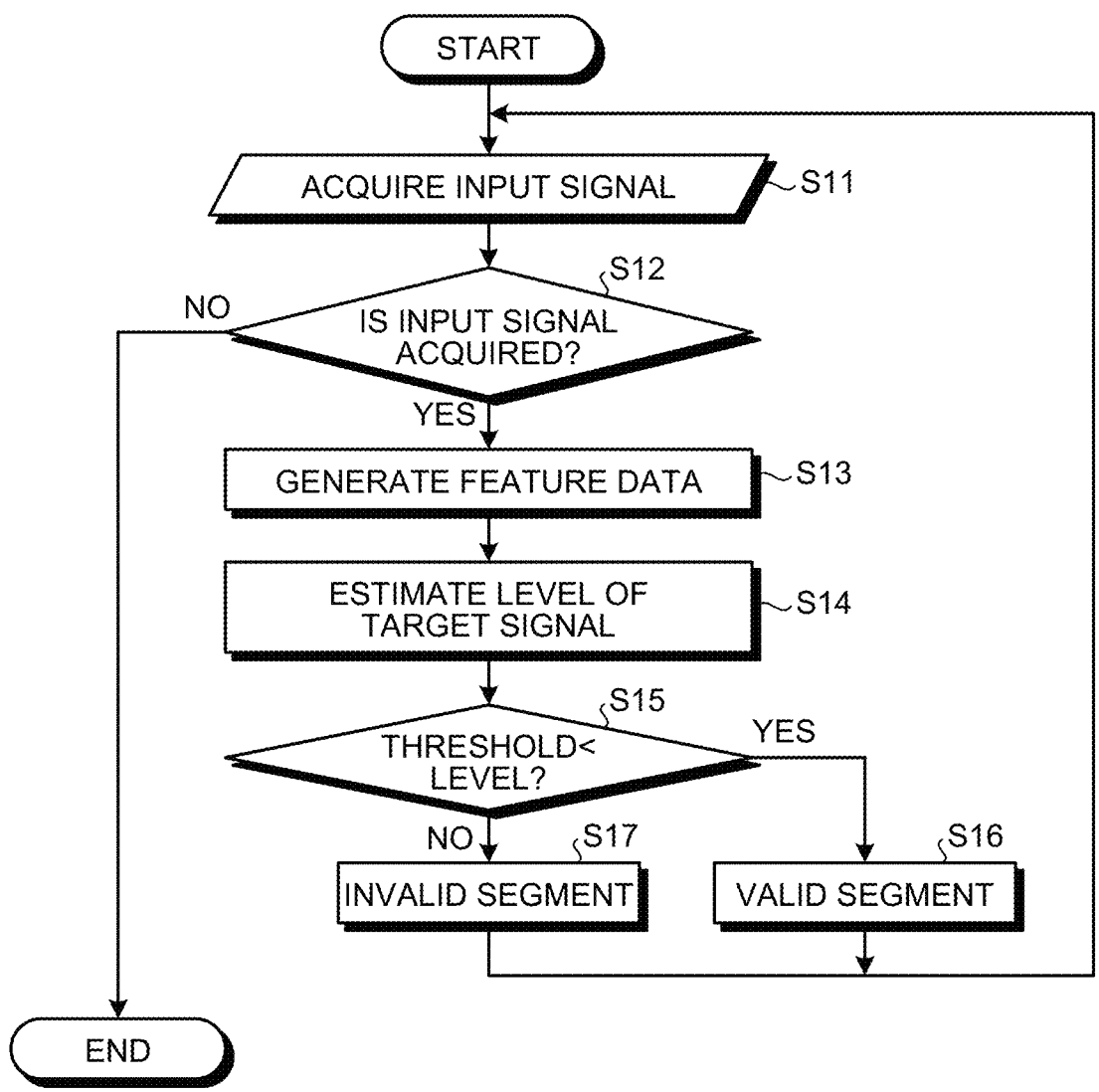
FIG. 2 is a flowchart illustrating a procedure of level estimation processing.

FIG. 2 is a flowchart illustrating a procedure of level estimation processing. The segment detecting device 20 performs the processing through the procedure as illustrated in FIG. 2.

First, at S11, the segment detecting device 20 acquires a new input signal corresponding to one frame among a sequence of frames that have been subjected to frame conversion. Subsequently, at S12, the segment detecting device 20 determines whether the new input signal is acquired. If the new input signal cannot be acquired (No at S12), the segment detecting device 20 ends this flow.

If the new input signal is acquired (Yes at S12), the segment detecting device 20 advances the process to S13. At S13, the segment detecting device 20 generates the feature data corresponding to one frame.

Subsequently, at S14, the segment detecting device 20 estimates, for the target frame, the level of the target signal using the neural network. The segment detecting device 20 may also estimate the level of the target signal included in the target frame by using a plurality of adjacent frames including the target frame. In a case in which input signals corresponding to the number of frames required for estimating the level of the target signal are not acquired at the time when the input signal is started, the segment detecting device 20 repeats acquisition processing for the input signal at S11 until the input signals corresponding to the required number of frames are acquired.

Subsequently, at S15, the segment detecting device 20 determines whether the estimated level is larger than the set threshold. If the estimated level is larger than the threshold (Yes at S15), the segment detecting device 20 determines that the target frame is the valid segment including the target signal at S16. If the estimated level is equal to or smaller than the threshold (No at S15), the segment detecting device 20 determines that the target frame is the invalid segment not including the target signal, at S17.

After ending the processing at S16 or S17, the segment detecting device 20 returns the process to S11, and performs pieces of processing at S11 to S17 for the next frame.

Figure 3:
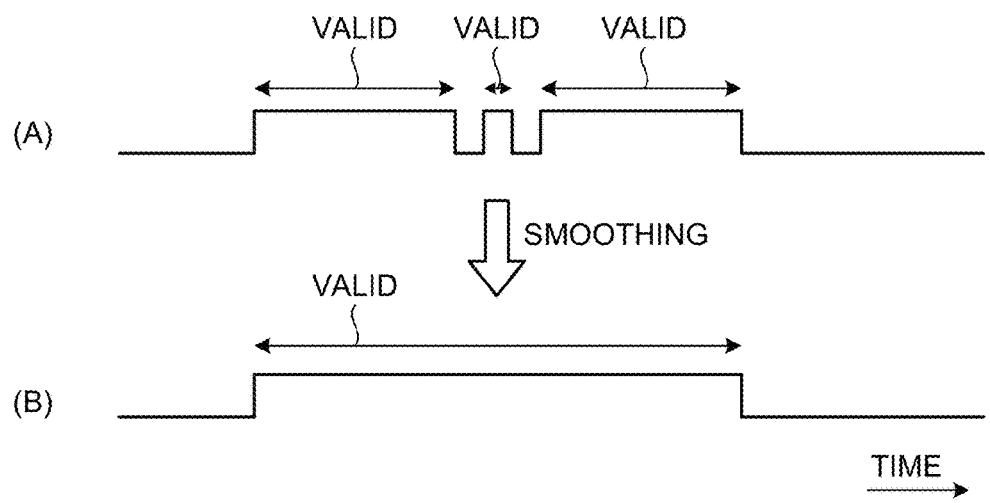
FIG. 3 is a diagram for explaining smoothing processing.

FIG. 3 is a diagram for explaining smoothing processing. After performing the processing through the procedure illustrated in FIG. 2, the segment detecting device 20 may further perform the smoothing processing as illustrated in FIG. 3.

In the smoothing processing, the segment detecting device 20 smoothes the determination result for each frame in the time direction to be output. For example, the determination unit 60 may cause the invalid segment including a predetermined number or less of frames to be the valid segment. More specifically, for example, the segment detecting device 20 changes, to the valid segment, the invalid segment including a second number or less of frames held between two valid segment s each including a first number or more frames. Due to this, the determination unit 60 can cause the silent (noise) segment that is recognized as part of human voice, to be the voice segment.

In contrast, in a case in which the valid segment includes a predetermined number or less of frames, the segment detecting device 20 may change the valid segment to the invalid segment. For example, the segment detecting device 20 may change, to the invalid segment, the valid segment including the second number or less of frames held between the two invalid segments each including the first number or more of frames.

Figure 4:
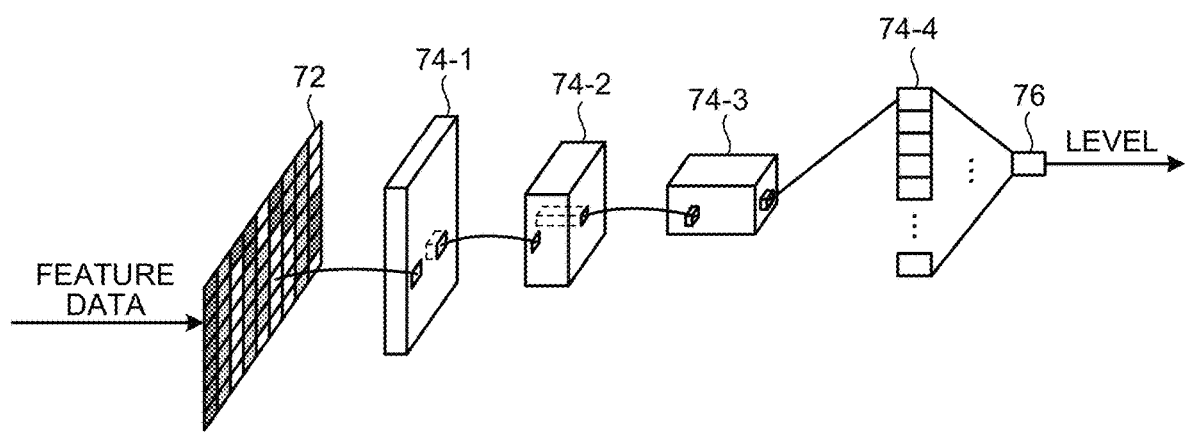
FIG. 4 is a diagram illustrating an example of a neural network included in an estimation unit.

FIG. 4 is a diagram illustrating an example of the neural network included in the estimation unit 58. The neural network included in the estimation unit 58 may be a Convolutional Neural Network (CNN) as illustrated in FIG. 4, for example.

The neural network includes an input layer 72, a first intermediate layer 74-1, a second intermediate layer 74-2, a third intermediate layer 74-3, a fourth intermediate layer 74-4, and an output layer 76.

The input layer 72 acquires a data group including the feature vector of the target frame, feature vectors of continuous N (N is an integral number equal to or larger than 1) frames temporally before the target frame, and feature vectors of continuous M (M is an integral number equal to or larger than 1) frames temporally after the target frame.

For example, the feature vector is a vector represented in twenty-four dimensions. Additionally, N=5, and M=5 are satisfied. In such a case, the input layer 72 acquires a data group that is arranged similarly to image data having a dot number of 11×24.

The first intermediate layer 74-1 performs convolution processing, pooling processing, and arithmetic processing for an activation function on a data group stored in an output channel of the input layer 72. For example, the first intermediate layer 74-1 performs convolution processing using a kernel size of 5×5, and maximum value pooling processing of 2×2 to generate values corresponding to ten output channels. The first intermediate layer 74-1 uses ReLU as the activation function.

The second intermediate layer 74-2 performs convolution processing, pooling processing, and arithmetic processing for the activation function on a data group stored in an output channel of the first intermediate layer 74-1. For example, the second intermediate layer 74-2 performs convolution processing using a kernel size of 5×5, and maximum value pooling processing of 2×2 to generate values corresponding to twenty output channels. The second intermediate layer 74-2 uses ReLU as the activation function.

The third intermediate layer 74-3 performs convolution processing, pooling processing, and arithmetic processing for the activation function on a data group stored in an output channel of the second intermediate layer 74-2. For example, the third intermediate layer 74-3 performs convolution processing using a kernel size of 5×5, and maximum value pooling processing of 2×2 to generate values corresponding to forty output channels. The third intermediate layer 74-3 uses ReLU as the activation function.

The fourth intermediate layer 74-4 performs flattening processing and a fully connected operation on a data group stored in an output channel of the third intermediate layer 74-3. The fourth intermediate layer 74-4 performs flattening processing and a fully connected operation to calculate values corresponding to one hundred flattened output channels.

The output layer 76 performs a fully connected layer operation on a data group stored in an output channel of the fourth intermediate layer 74-4 to generate a value corresponding to one output channel. The estimation unit 58 then outputs the value stored in the output layer 76 of the neural network as an estimation value of the level of the target signal.

The neural network may estimate the level of the target signal as a multiclass classification problem. In this case, the output layer 76 includes a plurality of output channels corresponding to a plurality of discretized levels. The output layer 76 performs a fully connected operation to calculate a value corresponding to each of the output channels. In this case, the estimation unit 58 outputs, as the estimation value of the level of the target signal, a level corresponding to the output channel storing the largest value (or the smallest value) in the output layer 76. The estimation unit 58 may include a neural network having another configuration, not limited to the configuration described above.

Figure 5:
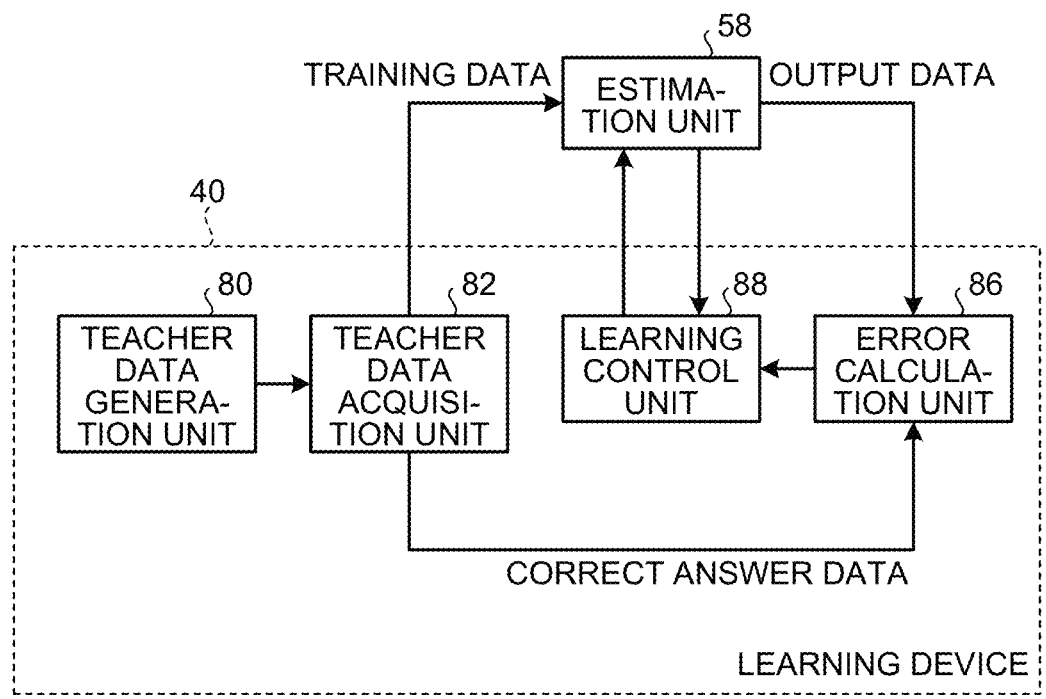
FIG. 5 is a diagram illustrating a configuration of a learning device together with an estimation unit.

FIG. 5 is a diagram illustrating a configuration of the learning device 40 together with the estimation unit 58. The learning device 40 includes a teacher data generation unit 80, a teacher data acquisition unit 82, an error calculation unit 86, and a learning control unit 88.

The teacher data generation unit 80 generates a plurality of pieces of teacher data. Each of the pieces of teacher data includes training data and correct answer data. The training data is the input signal or the feature data received by the estimation unit 58. The correct answer data represents the level of the target signal (in the present embodiment, the voice signal) included in the input signal represented by the training data. The configuration of the teacher data generation unit 80 will be further described below with reference to FIG. 6.

The teacher data acquisition unit 82 successively acquires pieces of teacher data generated by the teacher data generation unit 80 one by one. The teacher data acquisition unit 82 gives the correct answer data included in the acquired teacher data to the error calculation unit 86.

The teacher data acquisition unit 82 gives the training data to the estimation unit 58 and causes the estimation unit 58 to estimate the level of the target signal. In response to the given training data, the estimation unit 58 outputs output data representing the level of the target signal.

The error calculation unit 86 acquires the output data from the estimation unit 58. The error calculation unit 86 also acquires the correct answer data included in the teacher data together with the training data given to the estimation unit 58. The error calculation unit 86 gives an error between the output data and the correct answer data to a predetermined evaluation function, and calculates an evaluation value of the error between the output data and the correct answer data. The error calculation unit 86 gives the calculated evaluation value of the error to the learning control unit 88.

The learning control unit 88 changes a plurality of coefficients set in the neural network included in the estimation unit 58 based on the evaluation value calculated the error calculation unit 86 so that output data close to the correct answer data is output from the estimation unit 58. For example, the learning control unit 88 trains the neural network included in the estimation unit 58 using an error back propagation method.

The learning device 40 repeatedly trains the neural network included in the estimation unit 58 using a plurality of pieces of the teacher data. Due to this, the learning device 40 can train the estimation unit 58 to have the estimation unit 58 estimate the level of the target signal with high accuracy.

Figure 6:
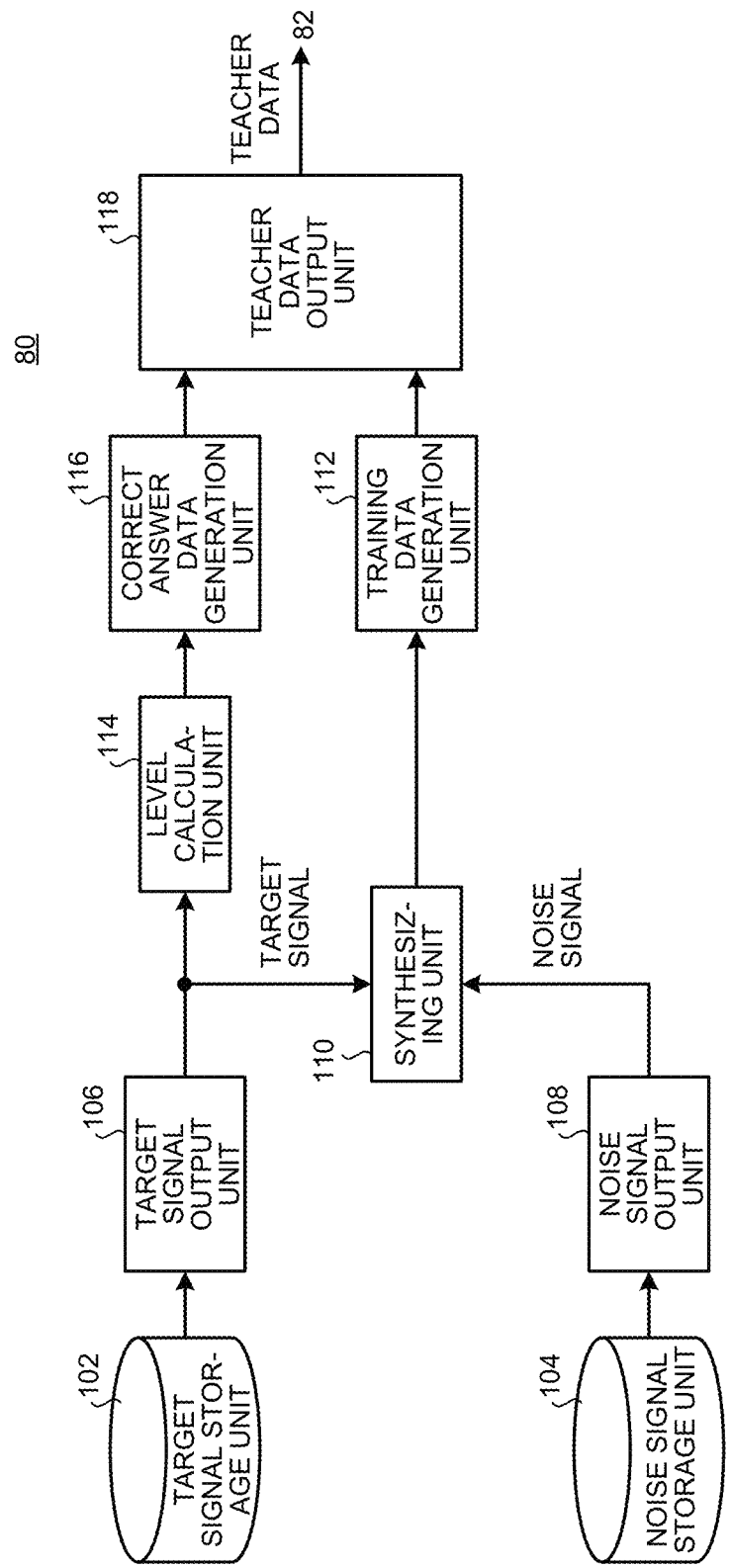
FIG. 6 is a diagram illustrating a configuration of a teacher data generation unit according to a first embodiment.

FIG. 6 is a diagram illustrating the configuration of the teacher data generation unit 80 according to the first embodiment. The teacher data generation unit 80 includes a target signal storage unit 102, a noise signal storage unit 104, a target signal output unit 106, a noise signal output unit 108, a synthesizing unit 110, a training data generation unit 112, a level calculation unit 114, a correct answer data generation unit 116, and a teacher data output unit 118.

The target signal storage unit 102 stores waveform data of a clear target signal not including noise. In the clear target signal, noise included therein is not necessarily completely 0, but it is sufficient that noise included therein is sufficiently small. For example, the target signal storage unit 102 may store the target signal representing human voice collected by a microphone and the like, or may store the target signal representing human voice that is mechanically generated.

The noise signal storage unit 104 stores waveform data of a noise signal. For example, the noise signal storage unit 104 may store a signal obtained by collecting noise in an environment to which the signal processing system 10 is applied by a microphone and the like, or may store a signal representing noise that is mechanically generated.

The target signal output unit 106 reads out target signals corresponding to predetermined frames from the target signal storage unit 102 to be output. The target signal output unit 106 may change the level of the target signal by multiplying the read-out target signal by gain. The target signal output unit 106 may change the gain to be multiplied by the target signal so that the level of the target signal falls within a predetermined range.

The noise signal output unit 108 reads out noise signals corresponding to predetermined frames from the noise signal storage unit 104 to be output. The noise signal output unit 108 may change the level of the noise signal by multiplying the read-out noise signal by gain. The noise signal output unit 108 may also randomly change the gain to be multiplied by the noise signal.

The synthesizing unit 110 synthesizes the target signal output from the target signal output unit 106 with the noise signal output from the noise signal output unit 108 to generate a signal including the noise signal and the target signal. For example, the synthesizing unit 110 generates a signal obtained by adding up the target signal and the noise signal.

The training data generation unit 112 generates training data based on the signal output from the synthesizing unit 110. The training data generation unit 112 generates feature data by analyzing a feature of the signal output from the synthesizing unit 110, and outputs the generated feature data as training data. The training data generation unit 112 may also cause waveform data representing a signal output from the synthesizing unit 110 to be the training data.

The level calculation unit 114 calculates the level of the target signal output from the target signal output unit 106. For example, the level calculation unit 114 calculates power of the target signal for each frame. For example, the level calculation unit 114 may also calculate energy of the target signal in the frame for each frame.

The correct answer data generation unit 116 generates the correct answer data based on the level of the target signal calculated by the level calculation unit 114. For example, the correct answer data generation unit 116 generates, as the correct answer data, data obtained by converting the level of the target signal into a number.

The teacher data output unit 118 generates teacher data obtained by pairing the training data output from the training data generation unit 112 with the correct answer data output from the correct answer data generation unit 116. The teacher data output unit 118 gives the generated teacher data to the teacher data acquisition unit 82.

The teacher data generation unit 80 may previously generate a plurality of pieces of teacher data corresponding to a predetermined number of frames to be stored in a memory. The teacher data generation unit 80 may then output any of the pieces of teacher data stored in the memory to the teacher data acquisition unit 82 in response to a request and the like by the teacher data acquisition unit 82.

The teacher data generation unit 80 as described above can easily create the correct answer data. For example, the teacher data generation unit 80 generates the training data by synthesizing the target signal with the noise signal, so that the teacher data generation unit 80 can generate the correct answer data based on the target signal not including the noise signal. Such correct answer data can be generated by an information processing device instead of being manually created by a person. Thus, the teacher data generation unit 80 can generate the correct answer data with a small load without intervention of a person.

As described above, the signal processing system 10 according to the first embodiment estimates the level of the target signal by using the neural network, and compares the estimated level with the threshold to determine the valid segment including the target signal in the input signal. Due to this, the teacher data is not manually created by a person but can be generated by the information processing device, so that the signal processing system 10 can train the neural network by using the teacher data that is generated with a small load. Thus, the signal processing system 10 can determine the valid segment including the target signal in the input signal with high accuracy by training with a small load.

Furthermore, the signal processing system 10 according to the present embodiment determines the valid segment by comparing the estimated level with the threshold, so that the threshold can also be adjusted. Thus, at the time of signal processing, the signal processing system 10 can adaptively change the threshold in accordance with a determination result of the voice segment. The signal processing system 10 can also adjust the threshold so that errors in determination of the voice segment are reduced. For example, conventionally, relearning of the neural network is required in a case in which the number of errors in determination of the voice segment is large. However, the signal processing system 10 can reduce the number of errors in recognition by adjusting the threshold, so that a load of training can be reduced.

Second Embodiment

Next, the following describes the signal processing system 10 according to a second embodiment. The signal processing system 10 according to the second embodiment has substantially the same function and configuration as those in the first embodiment, so that a portion having substantially the same function and configuration is denoted by the same reference numeral, and detailed description thereof will be omitted except differences.

Figure 7:
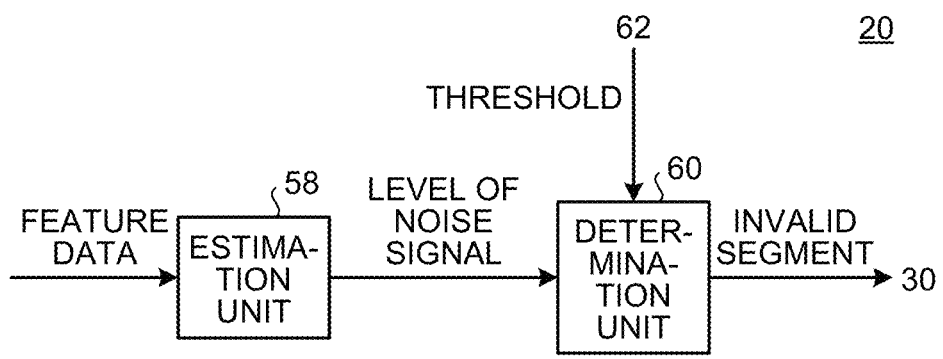
FIG. 7 is a diagram illustrating part of a segment detecting device according to a second embodiment.

FIG. 7 is a diagram illustrating part of the segment detecting device 20 according to the second embodiment. In the second embodiment, the estimation unit 58 receives feature data representing one or a plurality of the features of the input signal, and estimates a level of the noise signal (a value representing a magnitude of the noise signal included in the input signal) by inputting the feature data to the neural network. In contrast to the first embodiment described above, in the second embodiment, the target signal is an example of the "first signal", and the noise signal is an example of the "second signal".

In the second embodiment, the determination unit 60 determines a segment in which the noise signal is large in the input signal (invalid segment) by comparing the set threshold with the level of the noise signal estimated by the estimation unit 58. For example, the determination unit 60 determines a frame in which the estimated level is larger than the threshold to be the invalid segment. For example, the determination unit 60 determines a frame in which the estimated level is equal to or smaller than the threshold to be the valid segment. The signal processing device 30 then performs signal processing on a portion (valid segment) other than the portion that is determined to be the invalid segment based on the determination data in the input signal.

The estimation unit 58 according to the second embodiment may directly receive the input signal instead of the feature data, and may give the received input signal to the neural network. The estimation unit 58 may receive the input signal together with the feature data generated by the feature generation unit 56, and give both of the received input signal and the feature data to the neural network.

Figure 8:
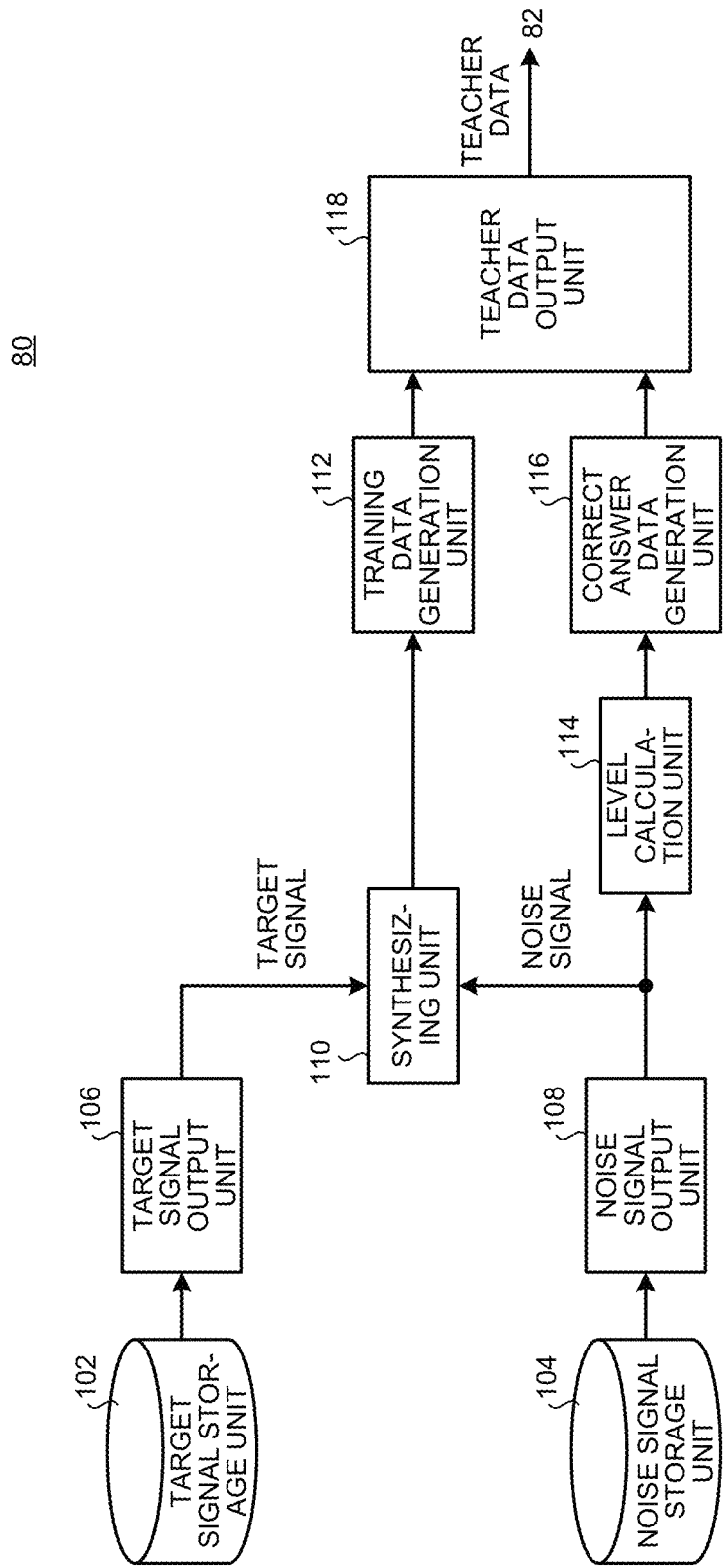
FIG. 8 is a diagram illustrating a configuration of a teacher data generation unit according to the second embodiment.

FIG. 8 is a diagram illustrating the configuration of the teacher data generation unit 80 according to the second embodiment. In the second embodiment, the level calculation unit 114 calculates the level of the noise signal output from the noise signal output unit 108. For example, the level calculation unit 114 calculates power of the noise signal for each frame. Alternatively, for example, the level calculation unit 114 may calculate energy of the noise signal in the frame for each frame.

In the second embodiment, the correct answer data generation unit 116 generates the correct answer data based on the level of the noise signal calculated by the level calculation unit 114. For example, the correct answer data generation unit 116 generates, as the correct answer data, data obtained by converting the level of the noise signal into a number.

As described above, the signal processing system 10 according to the second embodiment estimates the level of the noise signal using the neural network, and compares the estimated level with the threshold to determine the invalid segment in which the noise signal is large in the input signal. Due to this, the signal processing system 10 can train the neural network by using the teacher data that is generated with a small load. Thus, the signal processing system 10 can determine the invalid segment in which the noise signal is large in the input signal with high accuracy by training with a small load.

Alternatively, the segment detecting device 20 may have a configuration as described below. For example, the segment detecting device 20 calculates the level of the input signal, and subtracts the level of the noise signal estimated by using the neural network from the calculated level of the input signal. Subsequently, the segment detecting device 20 may determine the segment including the target signal in the input signal by comparing the threshold with a level obtained by subtracting the level of the noise signal from the level of the input signal. Due to this, the segment detecting device 20 can determine the segment including the target signal in the input signal assuming that the level obtained by subtracting the level of the noise signal from the level of the input signal is the level of the target signal.

Alternatively, for example, the segment detecting device 20 may set a threshold corresponding to the estimated level of the noise signal, and determine the segment including the target signal in the input signal by comparing the threshold with the level of the input signal. Due to this, the segment detecting device 20 can determine the segment including the target signal in the input signal based on the estimated level of the noise signal.

Third Embodiment

Next, the following describes the signal processing system 10 according to a third embodiment. The signal processing system 10 according to the third embodiment has substantially the same function and configuration as those in the first embodiment, so that a portion having substantially the same function and configuration is denoted by the same reference numeral, and detailed description thereof will be omitted except differences.

Figure 9:
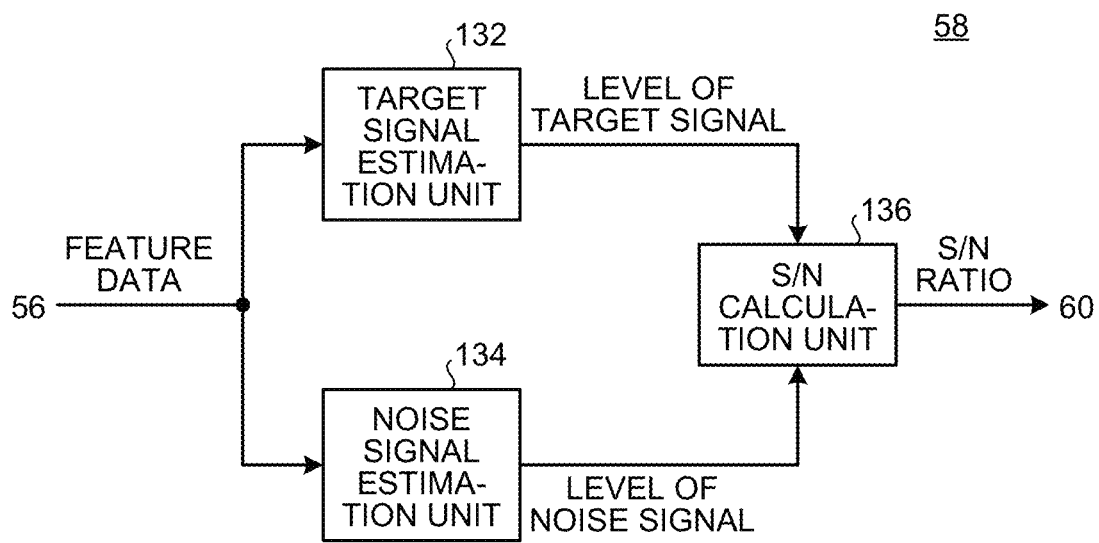
FIG. 9 is a diagram illustrating a configuration of an estimation unit according to a third embodiment.
Figure 10:
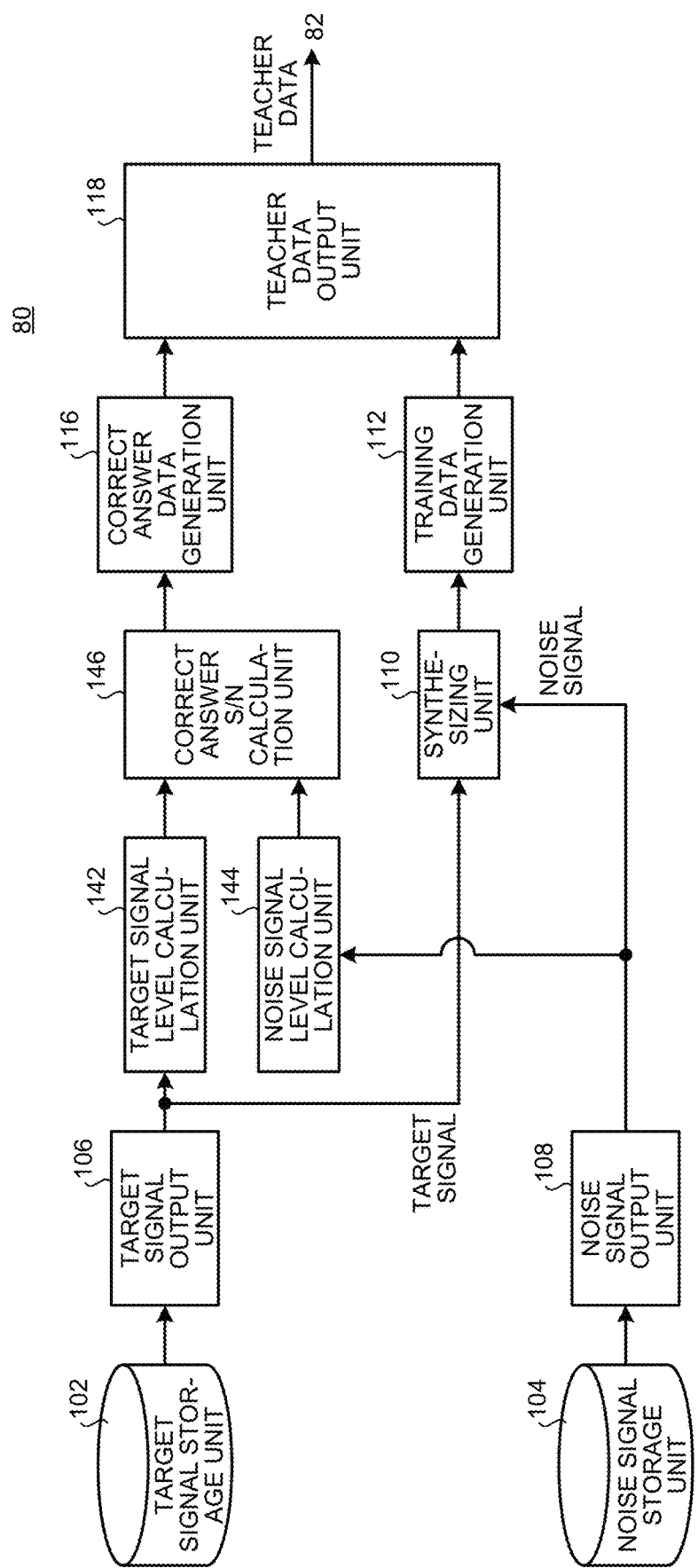
FIG. 10 is a diagram illustrating a configuration of a teacher data generation unit according to the third embodiment.

FIG. 9 is a diagram illustrating a configuration of the estimation unit 58 according to the third embodiment. In the third embodiment, the estimation unit 58 receives the feature data representing one or a plurality of features of the input signal, and estimates a ratio between the level of the target signal and the level of the noise signal (S/N ratio) by inputting the feature data to the neural network.

In the third embodiment, the determination unit 60 determines the valid segment including the target signal in the input signal by comparing the set threshold with the ratio (S/N ratio) estimated by the estimation unit 58. For example, the determination unit 60 determines a frame in which the estimated ratio is larger than the threshold to be the valid segment. For example, the determination unit 60 determines a frame in which the estimated ratio is equal to or smaller than the threshold to be the invalid segment. The signal processing device 30 then performs signal processing on a portion that is determined to be the valid segment based on the determination data in the input signal.

For example, the estimation unit 58 may include a target signal estimation unit 132, a noise signal estimation unit 134, and an S/N calculation unit 136. The target signal estimation unit 132 is a neural network that receives the feature data, and estimates the level of the target signal based on the received feature data. The noise signal estimation unit 134 is a neural network that receives the feature data, and estimates the level of the noise signal based on the received feature data. The target signal estimation unit 132 and the noise signal estimation unit 134 may be implemented by one neural network. The S/N calculation unit 136 divides the level of the target signal output from the target signal estimation unit 132 by the level of the noise signal output from the noise signal estimation unit 134 to calculate the S/N ratio.

The learning device 40 according to the third embodiment trains the estimation unit 58 as a whole. The learning device 40 according to the third embodiment may train the target signal estimation unit 132 and the noise signal estimation unit 134 separately. In this case, the learning device 40 can train the target signal estimation unit 132 using the teacher data generated by the teacher data generation unit 80 according to the first embodiment. The learning device 40 can train the noise signal estimation unit 134 using the teacher data generated by the teacher data generation unit 80 according to the second embodiment.

The estimation unit 58 according to the third embodiment may directly receive the input signal instead of the feature data, and give the received input signal to the neural network. The estimation unit 58 may also receive the input signal together with the feature data generated by the feature generation unit 56, and give both of the received input signal and feature data to the neural network.

FIG. 8 is a diagram illustrating a configuration of the teacher data generation unit 80 according to the third embodiment. The teacher data generation unit 80 according to the third embodiment includes a target signal level calculation unit 142, a noise signal level calculation unit 144, and a correct answer S/N calculation unit 146 in place of the level calculation unit 114.

The target signal level calculation unit 142 calculates the level of the target signal output from the target signal output unit 106. For example, the target signal level calculation unit 142 calculates power of the target signal for each frame. Alternatively, for example, the target signal level calculation unit 142 may calculate energy of the target signal in the frame for each frame.

The noise signal level calculation unit 144 calculates the level of the noise signal output from the noise signal output unit 108. For example, the noise signal level calculation unit 144 calculates power of the noise signal for each frame. Alternatively, for example, the noise signal level calculation unit 144 may calculate energy of the noise signal in the frame for each frame.

The correct answer S/N calculation unit 146 calculates the S/N ratio by dividing the level of the target signal output from the target signal level calculation unit 142 by the level of the noise signal output from the noise signal level calculation unit 144 for each frame. In the third embodiment, the correct answer data generation unit 116 then generates correct answer data based on the S/N ratio calculated by the correct answer S/N calculation unit 146. For example, the correct answer data generation unit 116 generates, as the correct answer data, data obtained by converting the S/N ratio into a number.

As described above, the signal processing system 10 according to the third embodiment estimates the ratio between the level of the target signal and the level of the noise signal (S/N ratio) using the neural network, and compares the estimated ratio (S/N ratio) with the threshold to determine the valid segment including the target signal in the input signal. Due to this, the signal processing system 10 can train the neural network by using the teacher data that is generated with a small load. Thus, the signal processing system 10 can determine the valid segment including the target signal in the input signal with high accuracy by training with a small load.

Fourth Embodiment

Next, the following describes the signal processing system 10 according to a fourth embodiment. The signal processing system 10 according to the fourth embodiment has substantially the same function and configuration as those in the first embodiment, so that a portion having substantially the same function and configuration is denoted by the same reference numeral, and detailed description thereof will be omitted except differences.

Typically, in performing estimation using the neural network based on the feature data related to voice, it is preferable to reduce influence of a bias that may be entirely included in the feature data, and to focus on a substantial feature of the feature data. If influence of the bias can be reduced, a case in which a first bias is entirely included in the feature data can be compared with a case in which a second bias different from the first bias is entirely included therein based on an equal criterion, for example, so that accuracy in estimation using the neural network is expected to be improved.

Thus, the fourth embodiment reduces influence of the bias that may be entirely included in the feature data, and obtains an estimation result with high accuracy with a configuration as described below. The technique of the fourth embodiment can be combined with each of techniques of the first to the third embodiments to be performed.

Figure 11:
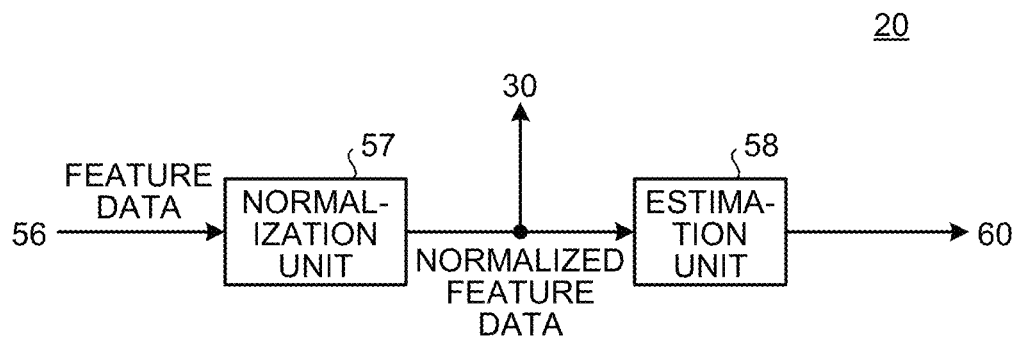
FIG. 11 is a diagram illustrating part of a segment detecting device according to a fourth embodiment.

FIG. 11 is a diagram illustrating part of the segment detecting device 20 according to the fourth embodiment.

As illustrated in FIG. 11, the segment detecting device 20 according to the fourth embodiment includes a normalization unit 57 at a latter stage of the feature generation unit 56 and at a preceding stage of the estimation unit 58. The normalization unit 57 receives an output from the feature generation unit 56, that is, the feature data indicating one or a plurality of features of the input signal, and normalizes the received feature data.

For example, in accordance with the following expression (10), the normalization unit 57 normalizes the feature data corresponding to a plurality of frames acquired as time series data so that an overall average value becomes zero.

$$w_{ij}^t = v_{ij}^t - m^t \tag{10}$$

In the expression (10) described above, $v_{ij}^t$ indicates a component of $(T+1+U) \times N$ matrix obtained by connecting N-dimensional feature vectors as feature data corresponding to past T frames and future U frames starting from the t-th frame as an estimation target of the level, and $w_{ij}^t$ indicates a normalized value output from the normalization unit 57. In this case, each of T and U is a nonnegative integer, and i and j satisfy $1 \leq i \leq T+1+U$ and $1 \leq j \leq N$. T and U may be determined to match a frame other than the target frame to be input to the neural network of the estimation unit 58, or may be determined to be larger than that frame.

In the expression (10) described above, $m^t$ is an average value of all components of the $(T+1+U) \times N$ matrix described above. $m^t$ can be obtained by the following expression (11).

$$m^t = \frac{1}{(T+U+1)N} \sum_{i=1}^{T+1+U} \sum_{j=1}^{N} v_{ij}^t \tag{11}$$

Through the normalization described above, for example, a case in which the first bias is entirely included in the feature data can be compared with a case in which the second bias different from the first bias is entirely included therein based on an equivalent criterion. Thus, through the normalization described above, it is possible to cause the estimation unit 58 to perform level estimation processing while reducing influence of the bias that may be entirely included in the feature data, so that accuracy in the level estimation processing can be improved.

In the above description, exemplified is the normalization focusing on only the average value. However, in the fourth embodiment, another method for normalization may be performed. For example, in accordance with the following expression (20), the normalization unit 57 may normalize (standardize) the feature data corresponding to a plurality of frames acquired as time series data so that the overall average value becomes zero, and variance becomes 1.

$$w_{ij}^t = \frac{v_{ij}^t - m^t}{\sigma^t} \tag{20}$$

In the expression (20) described above, definitions of $v_{ij}^t$, $w_{ij}^t$, and $m^t$ are the same as those in the example described above. In the expression (20) described above, $\sigma^t$ is a standard deviation of the feature data acquired as the time series data. $\sigma^t$ can be obtained by the following expression (21).

$$\sigma^t = \sqrt{\frac{1}{(T+U+1)N} \sum_{i=1}^{T+1+U} \sum_{j=1}^{N} (v_{ij}^t - m^t)^2} \tag{21}$$

Also through normalization (standardization) focusing on both of the average value and the variance, it is possible to reduce influence of the bias that may be entirely included in the feature data similarly to the normalization focusing on only the average value. As a result, accuracy in level estimation processing performed by the estimation unit 58 can be improved.

Figure 12:
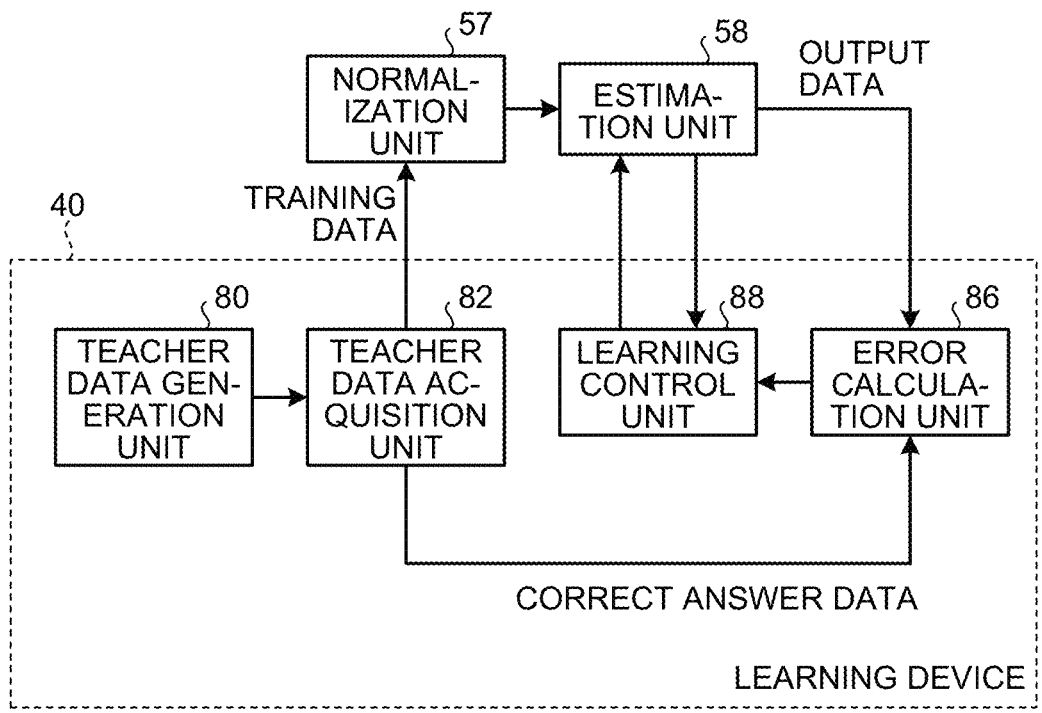
FIG. 12 is a diagram illustrating a configuration of a learning device according to the fourth embodiment together with a normalization unit and an estimation unit.

To adapt the neural network of the estimation unit 58 to input of the normalized value, as illustrated in FIG. 12 described below, the normalization unit 57 is required to be used for learning by the learning device 40.

FIG. 12 is a diagram illustrating a configuration of the learning device 40 according to the fourth embodiment together with the normalization unit 57 and the estimation unit 58.

As illustrated in FIG. 12, in the fourth embodiment, the normalization unit 57 is provided at a latter stage of the teacher data acquisition unit 82 and at a preceding stage of the estimation unit 58. The normalization unit 57 receives training data in the teacher data acquired by the teacher data acquisition unit 82, and normalizes the received training data. The estimation unit 58 then passes, to the error calculation unit 86 and the learning control unit 88, output data indicating an estimation result of the level obtained by inputting the normalized value to the neural network. Due to this, the neural network of the estimation unit 58 is appropriately trained, the estimation unit 58 outputting the estimation result of the level in accordance with an input of the normalized value.

As described above, in the fourth embodiment, the segment detecting device 20 further includes the normalization unit 57 that normalizes the input signal or the feature data. The estimation unit 58 then estimates the level of the target signal by inputting the input signal or the feature data normalized by the normalization unit 57 to the neural network. With this configuration, in estimating the level, it is possible to reduce influence of the bias that may be entirely included in the feature data. As a result, accuracy in the level estimation processing can be improved.

In the fourth embodiment, the learning device 40 also includes the normalization unit 57 that normalizes the training data included in the teacher data. The estimation unit 58 of the learning device 40 then estimates the level of the target signal by inputting, to the neural network, the input signal or the feature data as the training data normalized by the normalization unit 57. With this configuration, it is possible to easily generate the estimation unit 58 including the neural network that outputs the estimation result of the level in accordance with an input of the normalized value.

The technique according to the fourth embodiment is a technique for improving accuracy in estimation using the neural network, so that the technique according to the fourth embodiment can be applied not only to segment detection processing but also to voice recognition processing.

Figure 13:
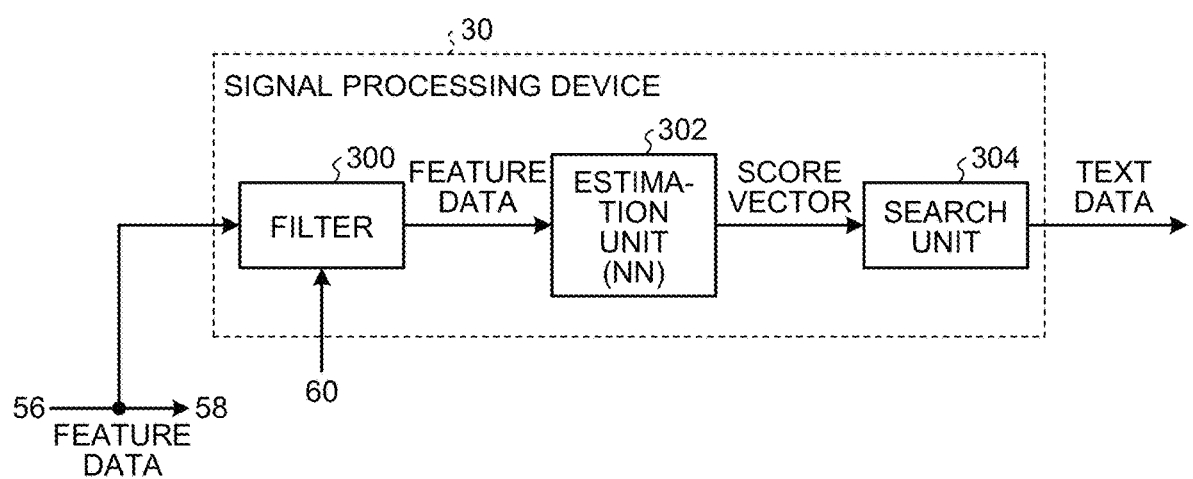
FIG. 13 is a diagram illustrating a schematic configuration of a signal processing device for voice recognition processing.

First, the following describes an outline of the voice recognition processing with reference to FIG. 13.

FIG. 13 is a diagram illustrating an example of a configuration of the signal processing device 30 for the voice recognition processing.

In the example illustrated in FIG. 13, the signal processing device 30 includes a filter 300, an estimation unit 302, and a search unit 304 as configurations for the voice recognition processing.

In a case in which a determination result received from the determination unit 60 (also refer to FIG. 1) is the valid segment, the filter 300 outputs the feature data to the estimation unit 302.

The estimation unit 302 includes a neural network (NN) that outputs, to the search unit 304, a score for each label such as a phoneme or a character as a score vector from the feature data output from the filter 300.

The search unit 304 searches for a label string having the best score among label strings that can be output based on the score vector output from the estimation unit 302, and outputs text data corresponding to the label string as a result of the voice recognition processing.

The search unit 304 may be configured to receive a notification from the filter 300 when the valid segment is changed to the invalid segment, and collectively output text data corresponding to the entire valid segment instead of successively outputting the text data.

Although FIG. 13 exemplifies the configuration of using the feature data generated by the feature generation unit 56 of the segment detecting device 20, another configuration can be considered such that the feature data for voice recognition processing is acquired from the input signal separately from the feature generation unit 56.

Figure 14:
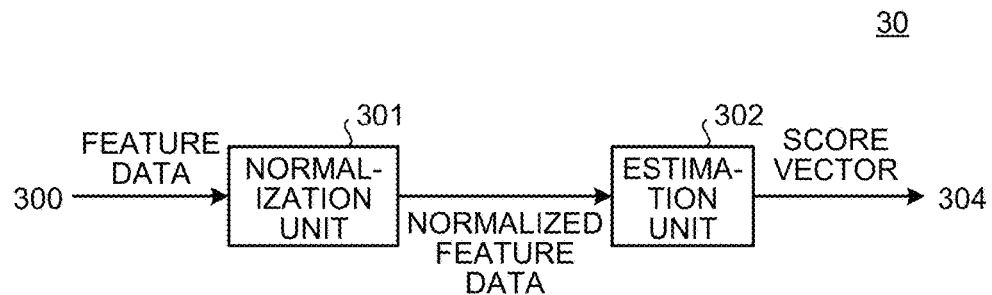
FIG. 14 is a diagram illustrating a configuration of the signal processing device for voice recognition processing including a normalization unit.

When the normalization technique according to the fourth embodiment is applied to the signal processing device 30 illustrated in FIG. 13, the following configuration illustrated in FIG. 14 is obtained.

FIG. 14 is a diagram illustrating a configuration of the signal processing device 30 for the voice recognition processing including a normalization unit 301.

In the example illustrated in FIG. 14, the signal processing device 30 includes the normalization unit 301 at a latter stage of the filter 300 and at a preceding stage of the estimation unit 302. The normalization unit 301 receives the feature data output from the filter 300, and normalizes the received feature data. Similarly to the fourth embodiment described above, the method for normalization may be any of a method of causing the average value to be zero, and a method of causing the average value to be zero and causing the variance to be 1.

According to the example illustrated in FIG. 14, a more appropriate score vector can be output while influence of the bias that is entirely included in the feature data is reduced, so that accuracy in the voice recognition processing can be improved.

The neural network included in the estimation unit 302 in the example illustrated in FIG. 14 may be trained by using a well-known method. The well-known method is, for example, a method described in https://arxiv.org/pdf/1508.01211.pdf, or https://www.cs.toronto.edu/~graves/phd.pdf.

Figure 15:
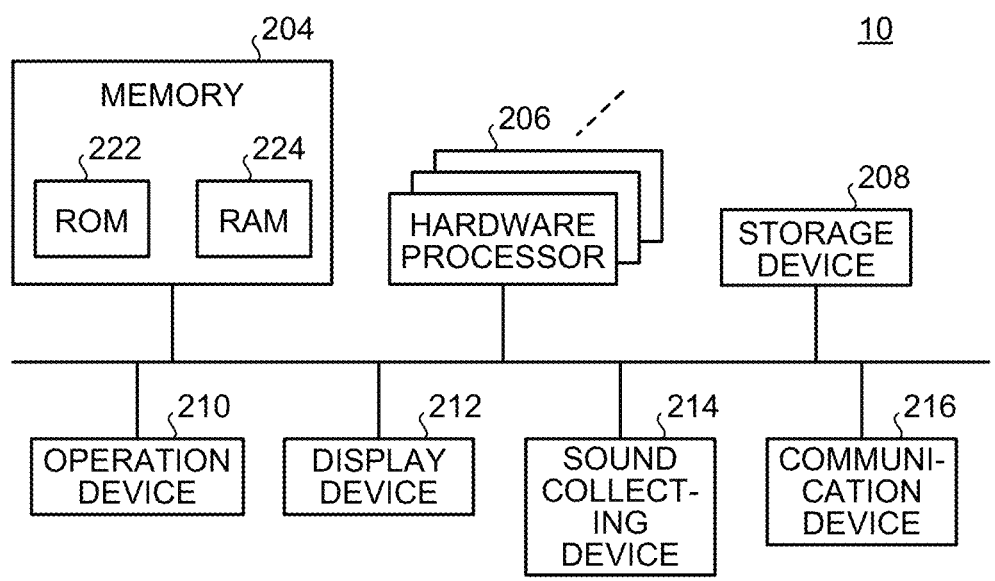
FIG. 15 is a diagram illustrating an example of a hardware configuration of a signal processing system.

FIG. 15 is a hardware block diagram of the signal processing system 10. By way of example, the signal processing system 10 is implemented by a hardware configuration similar to that of a typical computer (information processing device) as illustrated in FIG. 15. The signal processing system 10 may be implemented by one computer as illustrated in FIG. 15, or may be implemented by a plurality of computers that operate in cooperation with each other.

The signal processing system 10 includes a memory 204, one or a plurality of hardware processors 206, a storage device 208, an operation device 210, a display device 212, a sound collecting device 214, and a communication device 216. The respective parts are connected to each other via a bus.

The memory 204 includes, for example, a ROM 222 and a RAM 224. The ROM 222 stores a computer program used for controlling the signal processing system 10, various kinds of setting information, and the like in a non-rewritable manner. The RAM 224 is a volatile storage medium such as a Synchronous Dynamic Random Access Memory (SDRAM). The RAM 224 functions as a working area of one or a plurality of the hardware processors 206.

One or a plurality of the hardware processors 206 are connected to the memory 204 (the ROM 222 and the RAM 224) via the bus. One or a plurality of the hardware processors 206 may be, for example, one or a plurality of central processing units (CPUs), or may be one or a plurality of graphics processing units (GPUs). Alternatively, one or a plurality of the hardware processors 206 may be a semiconductor apparatus and the like including a dedicated processing circuit for implementing the neural network.

One or a plurality of the hardware processors 206 perform various kinds of processing in cooperation with various computer programs that are previously stored in the ROM 222 or the storage device 208 using a predetermined region of the RAM 224 as a working area, and integrally control operations of the respective parts constituting the segment detecting device 20 (the acquisition unit 52, the frame conversion unit 54, the feature generation unit 56, the estimation unit 58, the determination unit 60, and the threshold control unit 62), the signal processing device 30, and the learning device 40 (the teacher data generation unit 80, the teacher data acquisition unit 82, the error calculation unit 86, and the learning control unit 88). Additionally, one or a plurality of the hardware processors 206 control the operation device 210, the display device 212, the sound collecting device 214, the communication device 216, and the like in cooperation with a computer program that is previously stored in the ROM 222 or the storage device 208.

The storage device 208 is a rewritable recording device such as a storage medium using a semiconductor such as a flash memory, or a storage medium that is magnetically or optically recordable. The storage device 208 stores a computer program used for controlling the signal processing system 10, various kinds of setting information, and the like.

The operation device 210 is an input device such as a mouse and a keyboard. The operation device 210 receives information that is operated and input by a user, and outputs the received information to one or a plurality of the hardware processors 206.

The display device 212 displays information to the user. The display device 212 receives information and the like from one or a plurality of the hardware processors 206, and displays the received information. In a case of outputting the information to the communication device 216, the storage device 208, or the like, the signal processing system 10 does not necessarily include the display device 212.

The sound collecting device 214 collects voice to generate a voice signal, and samples the generated voice signal to be converted into data. In a case of acquiring the input signal from the communication device 216, the signal processing system 10 does not necessarily include the sound collecting device 214.

The sound collecting device 214 includes, for example, one microphone and a sampling circuit. The segment detecting device 20 performs processing on the voice signal output from the sound collecting device 214. Additionally, the learning device 40 generates teacher data using the voice signal generated by the sound collecting device 214. The sound collecting device 214 may be disposed outside the signal processing system 10 (separately as hardware).

The sound collecting device 214 may also include a microphone array including a plurality of microphones instead of one microphone. Due to this, the sound collecting device 214 can collect sound in a wide range, collect sound while following voice of a moving person, or collect sound by separating voice of a specific person from voice of a plurality of people.

The sound collecting device 214 may also include a headset microphone that collects voice in the vicinity of a mouth of a person, and a remote microphone disposed on an object other than a person. In this case, the sound collecting device 214 gives, to the learning device 40, both of a voice signal representing sound collected by the headset microphone and a voice signal representing sound collected by the remote microphone. The learning device 40 then generates training data based on the voice signal from the remote microphone, and generates correct answer data based on the voice signal from the headset microphone. The voice signal from the headset microphone has a high S/N ratio, so that the level and the like of the target signal can be calculated with high accuracy. Thus, by using the voice signal output from the sound collecting device 214 having such a configuration, the learning device 40 can generate teacher data with high accuracy.

The communication device 216 communicates with an external device to transmit/receive information to/from the external device via a network and the like. In a case of acquiring the input signal from the sound collecting device 214, the signal processing system 10 does not necessarily include the communication device 216.

The computer program executed by the signal processing system 10 according to the present embodiment is recorded and provided in a computer-readable recording medium such as a CD-ROM, a flexible disk (FD), a CD-R, and a digital versatile disc (DVD), as an installable or executable file.

The computer program executed by the signal processing system 10 according to the present embodiment may be stored in a computer connected to a network such as the Internet and provided by being downloaded via the network. Furthermore, the computer program executed by the signal processing system 10 according to the present embodiment may be provided or distributed via a network such as the Internet. The computer program executed by the signal processing system 10 according to the present embodiment may be embedded and provided in a ROM, for example.

A computer program for causing an information processing device to function as the segment detecting device 20 has a module configuration including an acquisition module, a frame conversion module, a feature generation module, an estimation module, a determination module, and a threshold control module. When this computer program is executed by one or a plurality of the hardware processors 206, the respective modules are loaded onto the RAM 224 of the memory 204, and one or a plurality of the hardware processors 206 are caused to function as the acquisition unit 52, the frame conversion unit 54, the feature generation unit 56, the estimation unit 58, the determination unit 60, and the threshold control unit 62. Some or all of the acquisition unit 52, the frame conversion unit 54, the feature generation unit 56, the estimation unit 58, the determination unit 60, and the threshold control unit 62 may be configured as hardware.

A computer program for causing the information processing device to function as the learning device 40 has a module configuration including a teacher data generation module, a teacher data acquisition module, an error calculation module, and a learning control module. When this computer program is executed by one or a plurality of the hardware processors 206, the respective modules are loaded onto the RAM 224 of the memory 204, and one or a plurality of the hardware processors 206 are caused to function as the teacher data generation unit 80, the teacher data acquisition unit 82, the error calculation unit 86, and the learning control unit 88. Some or all of the teacher data generation unit 80, the teacher data acquisition unit 82, the error calculation unit 86, and the learning control unit 88 may be configured as hardware.

In the above description of the embodiments, the configuration is made such that the neural network is used for estimating the level. However, other pre-trained models (pre-learned models) may be used so long as a supervised machine learning method is used. For example, a support vector machine, a decision tree, a random forest, and the like can be used.

Unlike the neural network described above in the respective embodiments, there is conventionally known a neural network trained by using label data for identifying voice or non-voice for each segment of the voice signal as the teacher data.

However, it is very difficult to automatically create the label data, so that a person needs to manually create the label data to train the neural network. Thus, for such a neural network, a large load has been required to create the label data for training.

For example, in a case of dividing the voice signal into segments of about 10 milliseconds, a segment immediately before a geminate consonant (double consonant) and a voiceless plosive becomes a silent or noise segment (non-voice segment). However, in a case in which a person manually creates the label data, such a segment may be determined to be the voice segment. Accordingly, in a case in which a person manually creates the label data, two labels of the voice segment and the non-voice segment may be added to segments of voice having substantially the same feature. Thus, in a case in which a person manually creates the label data, it has been difficult to train the neural network with high accuracy.

In contrast to such conventional examples, according to the embodiments described above, the teacher data can be generated by the information processing device instead of being manually created by a person, so that the neural network can be trained by using the teacher data that is generated with a small load. Thus, according to the embodiments, it is possible to determine the segment including the target signal in the input signal and the noise signal in the input signal, or the segment in which the S/N ratio of the input signal is higher than the threshold with high accuracy by training with a small load.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A segment detecting device comprising:
   at least one memory; and
   at least one processor configured to:
      receive an input signal including a first signal and a second signal,
      extract a frame having a predetermined time length from the input signal for each predetermined time,
      generate feature data by analyzing the frame of the input signal, the feature data representing one or a plurality of features of the input signal,
      estimate a level of the second signal in the frame by inputting the feature data into a neural network, and
      determine a segment including the second signal in the input signal based on the estimated level of the second signal,
      wherein the neural network is configured to output the estimated level of the second signal.

2. The segment detecting device according to claim 1, wherein the level of the second signal is estimated based on a frame other than a target frame as an estimation target of the level.

3. The segment detecting device according to claim 1, wherein the level of the second signal is a value representing a magnitude of the second signal included in the input signal.

4. The segment detecting device according to claim 1, wherein the at least one processor is further configured to normalize the feature data,
   wherein the normalized feature data is inputted into the neural network for estimating the level of the second signal.

5. The segment detecting device according to claim 4, wherein the feature data is normalized by using information extracted from a plurality of frames of the input signal.

6. The segment detecting device according to claim 1, wherein the first signal is a noise signal, and the second signal is a target signal.

7. A segment detecting device comprising:
   at least one memory; and
   at least one processor configured to:
      receive an input signal including a first signal and a second signal,
      extract a frame having a predetermined time length from the input signal for each predetermined time,
      generate feature data by analyzing the frame of the input signal, the feature data representing one or a plurality of features of the input signal,
      estimate a ratio between a level of the second signal and a level of the first signal in the frame by inputting the feature data into a neural network, and
      determine a segment including the second signal in the input signal based on the estimated ratio,
      wherein the neural network is configured to output the estimated ratio.

8. The segment detecting device according to claim 7, wherein the at least one processor is further configured to normalize the feature data,
   wherein the normalized feature data is inputted into the neural network for estimating the ratio.

9. The segment detecting device according to claim 8, wherein the feature data is normalized by using information extracted from a plurality of frames of the input signal.

10. The segment detecting device according to claim 7, wherein the first signal is a noise signal, and the second signal is a target signal.

11. A segment detecting method comprising:
    receiving, by at least one processor, an input signal including a first signal and a second signal,
    extracting, by the at least one processor, a frame having a predetermined time length from the input signal for each predetermined time,
    generating, by the at least one processor, feature data by analyzing the frame of the input signal, the feature data representing one or a plurality of features of the input signal,
    estimating, by the at least one processor, a level of the second signal in the frame by inputting the feature data into a neural network, and
    determining, by the at least one processor, a segment including the second signal in the input signal based on the estimated level of the second signal,
    wherein the neural network is configured to output the estimated level of the second signal.

12. The segment detecting method according to claim 11, wherein the level of the second signal is a value representing a magnitude of the second signal included in the input signal.

13. The segment detecting method according to claim 11, further comprising:
    normalizing, by the at least one processor, the feature data,
    wherein the normalized feature data is inputted into the neural network for estimating the level of the second signal.

14. The segment detecting method according to claim 13, wherein the normalizing includes normalizing, by the at least one processor, the feature data by using information extracted from a plurality of frames of the input signal.

15. A model generating method comprising:
    generating, by at least one processor, an input signal by synthesizing a second signal with a first signal,
    generating, by the at least one processor, correct answer data by calculating a level of the second signal using the second signal,
    acquiring, by the at least one processor, teacher data including training data and the correct answer data, the training data including at least one of (i) the input signal or (ii) feature data representing one or a plurality of features of the input signal, the correct answer data representing the level of the second signal;

estimating, by the at least one processor, the level of the second signal by inputting the training data into a neural network; and training, by the at least one processor, the neural network based on the estimated level of the second signal and the correct answer data, wherein the neural network is trained to output the estimated level of the second signal.

16. The model generation method according to claim 15, further comprising:

normalizing the input signal or the feature data, wherein the normalized input signal or the normalized feature data is inputted into the neural network for estimating the level of the second signal.

17. The model generation method according to claim 16, wherein the normalizing includes normalizing, by the at least one processor, the input signal or the feature data by using information extracted from a plurality of frames of the input signal.

18. The model generation method according to claim 15, further comprising:

adjusting the level of the second signal, wherein the correct answer data is generated based on using the level-adjusted second signal.

19. The model generation method according to claim 18, wherein the input signal is generated based on synthesizing the first signal with the level-adjusted second signal.

20. A learning device comprising:

at least one memory; and at least one processor configured to:

generate an input signal by synthesizing a second signal with a first signal, generate correct answer data by calculating a level of the second signal using the second signal, acquire teacher data including training data and the correct answer data, the training data including at least one of (i) the input signal or (ii) feature data representing one or a plurality of features of the input signal, the correct answer data representing the level of the second signal, estimate the level of the second signal by inputting the training data into a neural network, and train the neural network based on the estimated level of the second signal and the correct answer data, wherein the neural network is trained to output the estimated level of the second signal.

21. The learning device according to claim 20, wherein the at least one processor is configured to:

adjust the level of the second signal, wherein the correct answer data is generated based on using the level-adjusted second signal.

22. The learning device according to claim 21, wherein the input signal is generated based on synthesizing the first signal with the level-adjusted second signal.

* * * * *